US008629781B2

(12) United States Patent
Kowalkowski et al.

(10) Patent No.: US 8,629,781 B2
(45) Date of Patent: Jan. 14, 2014

(54) EFFICIENCY DETERMINATION FOR A SELECTIVE-CATALYTIC-REDUCTION CATALYST

(75) Inventors: Janean E. Kowalkowski, Northville, MI (US); Stephen Paul Levijoki, Swartz Creek, MI (US); John F. Van Gilder, Webberville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 368 days.

(21) Appl. No.: 13/101,348

(22) Filed: May 5, 2011

(65) Prior Publication Data

US 2012/0280819 A1 Nov. 8, 2012

(51) Int. Cl.
*G08B 17/10* (2006.01)
(52) U.S. Cl.
USPC ..... 340/633; 340/632; 73/114.75; 73/114.76; 422/105; 422/111; 422/182; 60/288; 60/301; 60/295; 60/297; 60/286; 60/285; 60/277; 60/276; 60/274; 60/299; 423/239.1; 423/239.2; 423/213.2; 423/213.5
(58) Field of Classification Search
USPC .................. 340/632, 633; 73/114.76, 114.75; 422/105, 111, 182; 60/288, 301, 297, 60/295, 286, 285, 277, 276, 274, 299; 423/239.1, 239.2, 213.5, 213.2
See application file for complete search history.

(56) References Cited

U.S. PATENT DOCUMENTS

| | | | |
|---|---|---|---|
| 5,787,705 A * | 8/1998 | Thoreson .......................... | 60/274 |
| 6,004,524 A * | 12/1999 | Morsbach et al. .......... | 423/239.1 |
| 6,041,067 A * | 3/2000 | Takamori et al. ............. | 370/514 |
| 6,205,774 B1 * | 3/2001 | Hohner et al. ................... | 60/277 |
| 6,843,971 B2 * | 1/2005 | Schafer-Sindlinger et al.. .............................. | 423/239.2 |
| 7,005,116 B2 * | 2/2006 | Schafer-Sindlinger et al. ........................... | 423/239.2 |
| 7,690,193 B2 * | 4/2010 | Wickert et al. .................. | 60/286 |
| 8,133,444 B2 * | 3/2012 | Toshioka et al. ............. | 422/182 |
| 8,161,808 B2 * | 4/2012 | Crawford et al. .......... | 73/114.75 |
| 8,181,451 B2 * | 5/2012 | VanderVeen et al. ........... | 60/295 |
| 8,220,254 B2 * | 7/2012 | Doring ............................ | 60/301 |
| 8,240,194 B2 * | 8/2012 | Dobson et al. ............. | 73/114.75 |
| 8,387,368 B2 * | 3/2013 | Parmentier et al. ............. | 60/286 |
| 8,397,489 B2 * | 3/2013 | Webb et al. ..................... | 60/285 |

(Continued)

FOREIGN PATENT DOCUMENTS

| | | | | |
|---|---|---|---|---|
| DE | 102008056860 A1 * | 5/2010 | ............... | F01N 3/20 |
| EP | 515857 A1 * | 12/1992 | ............. | B01D 53/30 |
| EP | 554766 A1 * | 8/1993 | ............. | B01D 53/36 |
| EP | 2181756 A1 * | 5/2010 | ............. | B01D 53/90 |

*Primary Examiner* — George Bugg
*Assistant Examiner* — Paul Obiniyi
(74) *Attorney, Agent, or Firm* — Quinn Law Group, PLLC

(57) ABSTRACT

A method of assessing overall efficiency of a selective-catalytic-reduction catalyst includes monitoring instantaneous efficiency of the catalyst. The method also includes determining the overall efficiency by summing instantaneous efficiency values weighted by a first set of coefficients if the most recent instantaneous efficiency value is above an instantaneous efficiency threshold. The method additionally includes determining the overall efficiency by summing instantaneous efficiency values weighted by a second set of coefficients if the most recent instantaneous efficiency value is equal to or below the instantaneous efficiency threshold. Furthermore, the method includes determining whether the overall efficiency has dropped below an overall efficiency threshold and reporting when the overall efficiency has dropped below the overall efficiency threshold. The second set of coefficients weighs the most recent instantaneous efficiency value more heavily than preceding instantaneous efficiency values as compared with the first set of coefficients. A system and a vehicle are also disclosed.

20 Claims, 2 Drawing Sheets

(56) References Cited

U.S. PATENT DOCUMENTS

| | | |
|---|---|---|
| 2002/0039550 A1* | 4/2002 | Schafer-Sindlinger et al. .......... 423/239.2 |
| 2005/0196333 A1* | 9/2005 | Schafer-Sindlinger et al. .......... 423/239.2 |
| 2006/0010859 A1* | 1/2006 | Yan et al. .......... 60/286 |
| 2006/0042235 A1* | 3/2006 | Kaboord .......... 60/286 |
| 2006/0075743 A1* | 4/2006 | Li et al. .......... 60/286 |
| 2006/0174608 A1* | 8/2006 | Hu et al. .......... 60/286 |
| 2007/0033928 A1* | 2/2007 | Hu et al. .......... 60/286 |
| 2007/0042495 A1* | 2/2007 | Pavlova-MacKinnon et al. .......... 436/55 |
| 2008/0163608 A1* | 7/2008 | Yacoub .......... 60/276 |
| 2008/0195297 A1* | 8/2008 | Wang et al. .......... 701/113 |
| 2009/0151339 A1* | 6/2009 | Doring .......... 60/295 |
| 2009/0155129 A1* | 6/2009 | Cho .......... 422/111 |
| 2009/0155130 A1* | 6/2009 | Choi .......... 422/111 |
| 2009/0158706 A1* | 6/2009 | Sun .......... 60/274 |
| 2010/0005781 A1* | 1/2010 | Schweizer .......... 60/276 |
| 2010/0050611 A1* | 3/2010 | Walz et al. .......... 60/286 |
| 2010/0058738 A1* | 3/2010 | Webb et al. .......... 60/285 |
| 2010/0101314 A1* | 4/2010 | Sasaki et al. .......... 73/114.75 |
| 2010/0111774 A1* | 5/2010 | Toshioka et al. .......... 422/105 |
| 2010/0122526 A1* | 5/2010 | VanderVeen et al. .......... 60/286 |
| 2010/0212417 A1* | 8/2010 | Crawford et al. .......... 73/114.76 |
| 2010/0242440 A1* | 9/2010 | Garimella et al. .......... 60/276 |
| 2010/0257844 A1* | 10/2010 | Shimomura et al. .......... 60/277 |
| 2010/0326052 A1* | 12/2010 | Sun .......... 60/274 |
| 2011/0023456 A1* | 2/2011 | Levijoki et al. .......... 60/274 |
| 2011/0023462 A1* | 2/2011 | Kurtz et al. .......... 60/286 |
| 2011/0023463 A1* | 2/2011 | Dobson et al. .......... 60/286 |
| 2011/0023591 A1* | 2/2011 | Dobson et al. .......... 73/114.75 |
| 2011/0047970 A1* | 3/2011 | Yezerets et al. .......... 60/274 |
| 2011/0056187 A1* | 3/2011 | Seyler et al. .......... 60/274 |
| 2011/0061373 A1* | 3/2011 | Zimmerman et al. .......... 60/286 |
| 2011/0113752 A1* | 5/2011 | Christner et al. .......... 60/274 |
| 2011/0113753 A1* | 5/2011 | Christner et al. .......... 60/274 |
| 2011/0146243 A1* | 6/2011 | Yanakiev et al. .......... 60/285 |
| 2011/0162347 A1* | 7/2011 | Katare et al. .......... 60/274 |
| 2011/0167805 A1* | 7/2011 | Chen .......... 60/286 |
| 2011/0210836 A1* | 9/2011 | Baumeister .......... 340/438 |
| 2011/0219747 A1* | 9/2011 | Geveci et al. .......... 60/274 |
| 2011/0258992 A1* | 10/2011 | Gonze et al. .......... 60/297 |
| 2011/0262329 A1* | 10/2011 | Ofoli et al. .......... 423/213.2 |
| 2011/0283678 A1* | 11/2011 | Zanetti et al. .......... 60/274 |
| 2011/0283680 A1* | 11/2011 | Gekas et al. .......... 60/274 |
| 2011/0314793 A1* | 12/2011 | Mullins et al. .......... 60/274 |
| 2012/0023907 A1* | 2/2012 | Brahma et al. .......... 60/274 |
| 2012/0126989 A1* | 5/2012 | Vernassa et al. .......... 340/606 |
| 2012/0275977 A1* | 11/2012 | Chandler et al. .......... 423/213.5 |
| 2012/0304751 A1* | 12/2012 | Dobson et al. .......... 73/114.75 |

\* cited by examiner

EFFICIENCY DETERMINATION FOR A SELECTIVE-CATALYTIC-REDUCTION CATALYST

TECHNICAL FIELD

The present invention is drawn to a system and a method for determining efficiency of a selective-catalytic-reduction catalyst.

BACKGROUND

Selective catalytic reduction (SCR) is a chemical process used for converting oxides of nitrogen ($NO_X$) with the aid of a catalyst into diatomic nitrogen ($N_2$) and water ($H_2O$). In modern motor vehicles, SCR is frequently used as part of an exhaust emissions control system of an internal combustion engine to reduce the subject engine's release of post-combustion $NO_X$ into the atmosphere. Gasoline, as well as diesel, engine emissions may be treated with SCR.

In a vehicle equipped with SCR, a reductant, which may be an aqueous solution of urea, is typically injected into the engine's exhaust stream. An SCR equipped vehicle typically carries its reductant onboard in a specially designed reservoir. The reductant is dosed into the engine's exhaust stream during engine operation in proportion to consumption of the engine's fuel. Once in the exhaust stream, the reductant is absorbed onto the system's SCR catalyst where the conversion of $NO_X$ takes place.

SUMMARY

A method of assessing overall operating efficiency of a selective-catalytic-reduction (SCR) catalyst includes monitoring instantaneous efficiency of the SCR catalyst. The method also includes determining the overall operating efficiency of the SCR catalyst by summing values of the instantaneous efficiency weighted by a first set of coefficients if the most recent value of the instantaneous efficiency of the SCR catalyst is above an instantaneous efficiency threshold. The method additionally includes determining the overall operating efficiency of the SCR catalyst by summing values of the instantaneous efficiency weighted by a second set of coefficients if the most recent value of the instantaneous efficiency of the SCR catalyst is equal to or below the instantaneous efficiency threshold. Furthermore, the method includes determining whether the overall operating efficiency of the SCR catalyst has dropped below an overall operating efficiency threshold and reporting when the overall operating efficiency of the SCR catalyst has dropped below the overall operating efficiency threshold. According to the method, the second set of coefficients weighs the most recent instantaneous efficiency value more heavily than preceding instantaneous efficiency values as compared with the first set of coefficients.

The act of determining the overall operating efficiency of the SCR catalyst by summing values of the instantaneous efficiency weighted by the second set of coefficients may be accomplished for a predetermined number of values of the instantaneous efficiency.

The act of determining the overall operating efficiency of the SCR catalyst may include employing an exponentially-weighted moving average (EWMA) filter. Accordingly, the EWMA filter may be employed to decrease the effect of more recent instantaneous efficiency values on the overall operating efficiency determination.

The SCR catalyst may be employed for reducing oxides of nitrogen ($NO_X$) emissions from an internal combustion engine. The engine may be a diesel type and the SCR catalyst may employ a diesel-exhaust-fluid (DEF) as a reductant supplied from a reservoir for reducing $NO_X$ emissions. Furthermore, the predetermined number of values of the instantaneous efficiency may be collected during a single key cycle of the engine.

The overall operating efficiency of the SCR catalyst being below the overall operating efficiency threshold may be indicative of the SCR catalyst having failed.

Monitoring the instantaneous efficiency of the SCR catalyst, determining the overall operating efficiency of the SCR catalyst, determining whether the overall operating efficiency of the SCR catalyst has dropped below the overall operating efficiency threshold, and reporting when the overall operating efficiency of the SCR catalyst has dropped below the overall operating efficiency threshold may be accomplished by a controller.

According to the method, the act of reporting when the overall operating efficiency of the SCR catalyst has dropped below the overall operating efficiency threshold may be accomplished by generating an alert to an operator of the engine.

A system for assessing overall operating efficiency of an SCR catalyst and a vehicle employing such a system are also provided.

The above features and advantages and other features and advantages of the present invention are readily apparent from the following detailed description of the best modes for carrying out the invention when taken in connection with the accompanying drawings.

DETAILED DESCRIPTION

Selective catalytic reduction (SCR) is a means of converting oxides of nitrogen, also referred to as $NO_X$ with the aid of a catalyst into diatomic nitrogen, $N_2$, and water, $H_2O$. A gaseous reductant, typically anhydrous ammonia, aqueous ammonia or urea, is added to a stream of exhaust gas and is absorbed onto the catalyst. SCR is frequently employed to reduce $NO_X$ emissions in the exhaust of internal combustion engines used to power motor vehicles. Exhaust emissions of both gasoline and diesel engines may be improved by SCR. A general term "diesel-exhaust-fluid" or DEF is used to describe a reductant that is employed by SCR in diesel engines.

Figure 1:
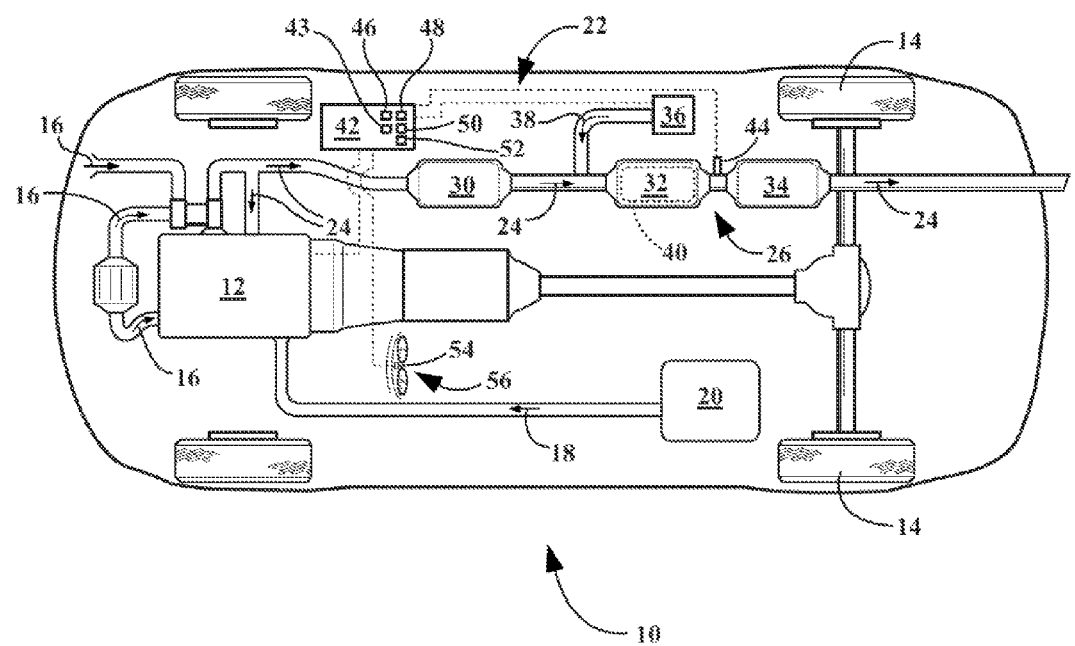
FIG. 1 is a schematic illustration of vehicle with an engine connected to an exhaust system having a selective-catalytic-reduction (SCR) catalyst.

Referring to the drawings, wherein like reference numbers refer to like components throughout the several views, FIG. 1 schematically depicts a motor vehicle 10. The vehicle 10 includes an internal combustion engine 12 configured to propel the vehicle via driven wheels 14. Although the engine 12 is a compression-ignition or diesel type as shown and described herein, the engine may also be configured as a spark-ignition or gasoline type. Internal combustion in the diesel engine 12 occurs when a specific amount of ambient air flow 16 is mixed with a metered amount of fuel 18 supplied from a fuel tank 20 and the resultant air-fuel mixture is compressed inside the engine's cylinders (not shown).

The vehicle 10 also includes a system 22 configured to assess overall operating efficiency of a selective-catalyticreduction (SCR) catalyst that is employed for treating noxious emissions contained in an exhaust gas stream 24 of the engine 12. The exhaust gas stream 24 is emitted from the engine 12 as a by-product of combustion, and is removed to the ambient through an exhaust system 26. The exhaust system 26 includes a series of exhaust after-treatment devices, shown as a diesel oxidation catalyst 30, an SCR catalyst 32, and a diesel particulate filter 34. Accordingly, the exhaust system 26 includes a passage for directing the exhaust gas stream 24 from the engine 12 through the series of exhaust after-treatment devices. The shown series of exhaust after-treatment devices 30, 32, and 34 is employed to reduce various exhaust emissions of engine 12. In particular, the diesel oxidation catalyst 30 is adapted to receive exhaust gas stream 24 from the engine 12 to oxidize and burn hydrocarbon emissions present in the exhaust gas. Following the diesel oxidation catalyst 30, the exhaust gas stream 24 is routed to the SCR catalyst 32, which is employed to reduce the emission of $NO_X$.

As shown in FIG. 1, the system 22 includes a reservoir 36 configured to supply a metered amount of a DEF 38 into the exhaust gas stream 24 upstream of the SCR catalyst 32. Accordingly, the DEF 38 accesses the SCR catalyst 32 as the exhaust gas stream 24 flows through SCR catalyst. An inner surface of the SCR catalyst 32 includes a wash coat 40. The wash coat 40 serves to attract the DEF 38 in order to deposit the DEF within the SCR catalyst 32 such that the DEF may interact with the exhaust gas stream 24 and generate a chemical reaction to reduce $NO_X$ emissions from the engine 12. After the exhaust gas stream 24 exits the SCR catalyst 32, but before it is allowed to pass to the atmosphere, the gas stream is routed through the diesel particulate filter 34 where the sooty particulate matter emitted from the engine 12 is collected and disposed through a regeneration process. Although, as shown, the SCR catalyst 32 is positioned upstream of the diesel particulate filter 30, the SCR catalyst may also be positioned downstream of the diesel particulate filter without affecting the effectiveness of the exhaust after-treatment devices 30, 32, and 34 in the after-treatment of the exhaust gas stream 24.

The SCR catalyst 32 is characterized by operating efficiency that is determined by the effectiveness of the catalyst in reducing $NO_X$ emissions from the engine 12. The structural integrity of the wash coat 40 is a major factor responsible for the operating efficiency of the SCR catalyst 32. The wash coat 40 may become degraded as a result of thermal stress generated by the exhaust gas stream 24 such that the wash coat becomes incapable of retaining the DEF 38 on the inner surface of the SCR catalyst 32. Accordingly, when the wash coat 40 becomes degraded, the chemical reaction necessary to reduce $NO_X$ emissions from the engine 12 cannot be sustained and, as a result, the operating efficiency of the SCR catalyst 32 also suffers.

The system 22 also includes a controller 42. The controller 42 may be a stand-alone unit, or be part of an electronic controller that regulates the operation of engine 12. The controller 42 is configured to monitor instantaneous efficiency of the SCR catalyst 32 by receiving from a probe 44 a signal indicative of the amount of $NO_X$ emissions remaining in the exhaust gas stream 24 after the exhaust gas stream has passed through the SCR catalyst. The controller 42 is programmed to receive the signal from the probe 44 at a predetermined rate that would be sufficient to detect any significant changes in the operating efficiency of the SCR catalyst 32 during operation of the engine 12. The system 22 may also include an upstream probe (not shown). In such a case, a signal from the upstream probe would be compared by the controller 42 to the signal from the probe 44 for detecting changes in the operating efficiency of the SCR catalyst 32.

The controller 42 is also configured to determine an overall operating efficiency 43 of the SCR catalyst 32 by summing values of the instantaneous efficiency communicated by the probe 44. Prior to being summed, each of the values of the instantaneous efficiency is weighted by a specific coefficient that is part of a predetermined set of coefficients. The instantaneous efficiency may also be determined over a specific sample size that can be defined by length of time or accumulated mass of $NO_X$ and then integrated to arrive at a specific value. Accordingly, instantaneous efficiency may be an integrated sum of efficiency values taken over an evaluation window. The particular set of coefficients to be used in any instance is dependent on an instantaneous efficiency threshold 46 that is predetermined during validation and testing of the SCR catalyst 32 behind the engine 12 and programmed into the controller 42.

The instantaneous efficiency threshold 46 is indicative of a boundary drawn empirically to delineate "normal" or generally effective operation of the SCR catalyst 32 from "abnormal" or degraded operation of the SCR catalyst at any particular instance. Accordingly, two situations are generally contemplated—where the instantaneous efficiency of the SCR catalyst 32 is above the instantaneous efficiency threshold 46 and where the instantaneous efficiency is equal to or below the instantaneous efficiency threshold. Furthermore, two separate courses of action in response to these two situations are programmed into the controller 42.

In the first situation, where the most recent detected value of the instantaneous efficiency of the SCR catalyst 32 is above the instantaneous efficiency threshold 46, a first set of coefficients 48 is used to weigh each value of the instantaneous efficiency. In the second situation, where the most recent detected value of the instantaneous efficiency of the SCR catalyst 32 is at or below the instantaneous efficiency threshold 46, a second set of coefficients 50 is used to weigh each value of the instantaneous efficiency. The second set of coefficients 50 weighs the most recent instantaneous efficiency value more heavily than preceding instantaneous efficiency values as compared with the first set of coefficients 48.

The controller 42 is also configured to determine whether the overall operating efficiency 43 of the SCR catalyst 32 has dropped below an overall operating efficiency threshold 52. The condition when the overall operating efficiency 43 of the SCR catalyst 32 has dropped below the overall operating efficiency threshold 52 may be identified as a failure of the SCR catalyst that necessitates the catalyst's servicing or replacement. The overall operating efficiency threshold 52 may be established empirically based on the minimum required conversion of $NO_X$ by the SCR catalyst 32 during various maneuvers of the vehicle 10 and the corresponding operation of the engine 12, as defined by a legislatively mandated emissions test.

The first and second sets of coefficients 48, 50 may be used as part of the determination of the overall operating efficiency 43 of the SCR catalyst 32 in an exponentially-weighted moving average (EWMA) filter programmed into the controller 42. The EWMA filter is a type of an infinite response filter which applies to discrete data points or values weighting coefficients that decrease exponentially. The weighting for each older data point decreases exponentially, never reaching zero. Therefore, the EWMA filter operates to decrease the effect of more recent instantaneous efficiency values on the determination of the overall operating efficiency 43 in order to preclude a premature assessment that the SCR catalyst 32 has failed. Such a decrease of the effect of more recent instantaneous efficiency values on the determination of the overall operating efficiency 43 is beneficial in addressing common operating conditions of the vehicle 10 that may result in significantly increased variability in SCR efficiency determination. Common operating conditions of the vehicle 10 that may result in such increased variability in SCR efficiency determination may include, for example, situations when the vehicle is ascending an extended steep grade or is pulling a heavy load. Non-steady state operation of the SCR itself may also influence increased variability in SCR efficiency determination.

As described above, the second set of coefficients 50 weighs the most recent instantaneous efficiency value more heavily than preceding instantaneous efficiency values as compared with the first set of coefficients 48. The second set of coefficients 50 is therefore used to accelerate a determination of the overall operating efficiency 43 of the SCR catalyst 32. For example, the first set of coefficients 48 may weigh the most recent instantaneous efficiency value as 20% of all the instantaneous efficiency values being summed in calculating the overall operating efficiency 43 of the SCR catalyst 32. In comparison, the second set of coefficients 50 may weigh the most recent instantaneous efficiency value as 60% of all the instantaneous efficiency values being summed in calculating the overall operating efficiency 43 of the SCR catalyst 32.

As noted above, the accelerated determination of the overall operating efficiency 43 of the SCR catalyst 32 is initiated by the controller 42 once the instantaneous efficiency of the catalyst has dropped to the instantaneous efficiency threshold 46. Accordingly, such accelerated determination of the overall operating efficiency 43 of the SCR catalyst 32 by using the second set of coefficients 50 permits a more rapid determination of whether the SCR catalyst has failed. Additionally, the specific weighting of the second set of coefficients 50 may be selected such that the assessment of whether the SCR catalyst 32 has failed may be reached within a predetermined number of instantaneous efficiency data points or values collected during a single key cycle of the engine 12. The actual number of instantaneous efficiency data points collected during a single key cycle of the engine 12 for reaching the assessment may be dependent on a legislative enactment, such as the United States Environmental Protection Agency (US EPA) OBDII, requiring the specific number.

The controller 42 is additionally configured to report when the overall operating efficiency 43 of the SCR catalyst 32 has dropped below the overall operating efficiency threshold 52. To achieve such reporting, the controller 42 may generate a sensory signal 54 indicative of the overall operating efficiency 43 of the SCR catalyst 32 being below the overall operating efficiency threshold 52. Such a sensory signal 54 may be displayed on an instrument panel 56 of the vehicle 10 as a visual alert in order to notify the vehicle's operator that servicing or replacement of the SCR catalyst 32 may be required.

Figure 2:
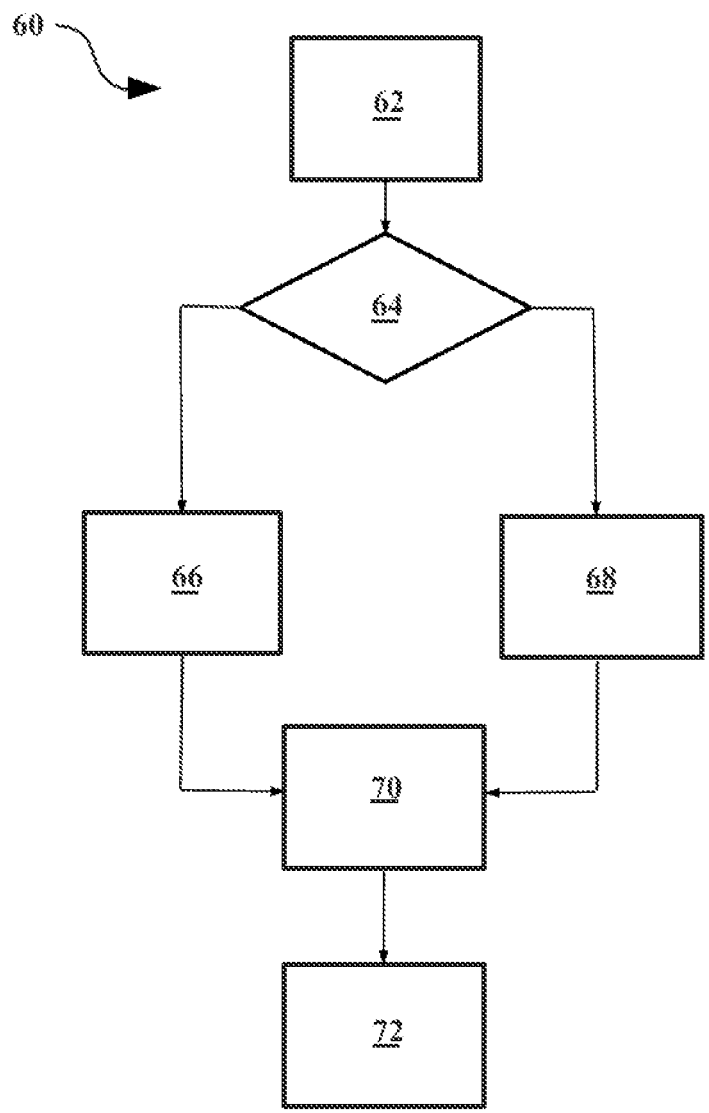
FIG. 2 is a flow diagram of a method for assessing overall operating efficiency of the SCR catalyst of FIG. 1.

FIG. 2 depicts a method 60 of assessing operating efficiency of the SCR catalyst 32, as described with respect to FIG. 1. Accordingly, the method commences in frame 62, where it includes monitoring instantaneous efficiency of the SCR catalyst 32. From frame 62, the method advances to frame 64, where the method determines whether the most recent value of the instantaneous efficiency of the SCR catalyst is above the instantaneous efficiency threshold 46, or is at or below the instantaneous efficiency threshold. If the most recent value of the instantaneous efficiency of the SCR catalyst is above the instantaneous efficiency threshold 46, the method proceeds to frame 66. In frame 66, the method includes determining the overall operating efficiency 43 of the SCR catalyst 32 by summing values of the instantaneous efficiency weighted by the first set of coefficients 48. As described above with respect to the system 22, each instantaneous efficiency value may be a specific data point or be determined over a specific sample size that can be defined by length of time or accumulated mass of $NO_X$ and then integrated to arrive at a specific value.

If, on the other hand, the most recent value of the instantaneous efficiency of the SCR catalyst is equal to or below the instantaneous efficiency threshold 46, the method proceeds to frame 68. In frame 68, the method includes determining the overall operating efficiency 43 of the SCR catalyst 32 by summing values of the instantaneous efficiency weighted by the second set of coefficients 50. As described relative to FIG. 1, the first and second sets of coefficients 48, 50 may be used as part of the determination of the overall operating efficiency 43 of the SCR catalyst 32 in a EWMA filter programmed into the controller 42. Accordingly, the sum of the weighted instantaneous efficiency values of the SCR catalyst 32 generated by the EWMA filter is representative of the overall operating efficiency 43 of the SCR catalyst at any particular moment in time.

Following the determination of the overall operating efficiency 43 of the SCR catalyst 32 in frame 66 or 68, the method moves on to frame 70. In frame 70, the method includes determining whether the overall operating efficiency 43 of the SCR catalyst 32 has dropped below an overall operating efficiency threshold 52. From frame 70, the method proceeds to frame 72. In frame 72, the method includes reporting when the overall operating efficiency 43 of the SCR catalyst 32 has dropped below the overall operating efficiency threshold 52. As described above relative to FIG. 1, a sensory signal 54 may be communicated to and displayed on the instrument panel 56 as a visual alert to affect such reporting. According to the method, the overall operating efficiency of the SCR catalyst 32 being below the overall operating efficiency threshold 52 may be indicative of the SCR catalyst having failed.

While the best modes for carrying out the invention have been described in detail, those familiar with the art to which this invention relates will recognize various alternative designs and embodiments for practicing the invention within the scope of the appended claims.

The invention claimed is:

1. A method of assessing overall operating efficiency of a selective catalytic reduction (SCR) catalyst, the method comprising:
   monitoring instantaneous efficiency of the SCR catalyst;
   determining the overall operating efficiency of the SCR catalyst by summing values of the instantaneous efficiency weighted by a first set of coefficients if the most recent value of the instantaneous efficiency of the SCR catalyst is above an instantaneous efficiency threshold;
   determining the overall operating efficiency of the SCR catalyst by summing values of the instantaneous efficiency weighted by a second set of coefficients if the most recent value of the instantaneous efficiency of the SCR catalyst is equal to or below the instantaneous efficiency threshold;
   determining whether the overall operating efficiency of the SCR catalyst has dropped below an overall operating efficiency threshold; and
   reporting when the overall operating efficiency of the SCR catalyst has dropped below the overall operating efficiency threshold;
   wherein the second set of coefficients weighs the most recent instantaneous efficiency value more heavily than preceding instantaneous efficiency values as compared with the first set of coefficients.

2. The method of claim 1, wherein said determining the overall operating efficiency of the SCR catalyst by summing values of the instantaneous efficiency weighted by the second set of coefficients is accomplished for a predetermined number of values of the instantaneous efficiency.

3. The method of claim 2, wherein said determining of the overall operating efficiency of the SCR catalyst includes employing an exponentially-weighted moving average (EWMA) filter to decrease the effect of more recent instantaneous efficiency values on the overall operating efficiency determination.

4. The method of claim 2, wherein the SCR catalyst is employed for reducing oxides of nitrogen ($NO_X$) emissions from an internal combustion engine.

5. The method of claim 4, wherein the engine is a diesel type and the SCR catalyst employs a diesel-exhaust-fluid (DEF) as a reductant supplied from a reservoir for reducing $NO_X$ emissions.

6. The method of claim 4, wherein the predetermined number of values of the instantaneous efficiency is collected during a single key cycle of the engine.

7. The method of claim 1, wherein the overall operating efficiency of the SCR catalyst being below the overall operating efficiency threshold is indicative of the SCR catalyst having failed.

8. The method of claim 1, wherein each of said monitoring instantaneous efficiency of the SCR catalyst, determining the overall operating efficiency of the SCR catalyst, determining whether the overall operating efficiency of the SCR catalyst has dropped below the overall operating efficiency threshold, and reporting when the overall operating efficiency of the SCR catalyst has dropped below the overall operating efficiency threshold is accomplished by a controller.

9. The method of claim 1, wherein said reporting when the overall operating efficiency of the SCR catalyst has dropped below the overall operating efficiency threshold is accomplished by generating an alert to an operator of the engine.

10. A system for assessing overall operating efficiency of a selective-catalytic-reduction (SCR) catalyst employed for treating exhaust emissions from an internal combustion engine, the system comprising:
a passage configured to direct an exhaust gas stream from the engine to the SCR catalyst;
a reservoir configured to supply a reductant through the passage and into the SCR catalyst for reducing oxides of nitrogen ($NO_X$) in the exhaust gas stream;
a controller configured to:
monitor instantaneous efficiency of the SCR catalyst;
determine the overall operating efficiency of the SCR catalyst by summing values of the instantaneous efficiency weighted by a first set of coefficients if the most recent value of the instantaneous efficiency of the SCR catalyst is above an instantaneous efficiency threshold;
determine the overall operating efficiency of the SCR catalyst by summing values of the instantaneous efficiency weighted by a second set of coefficients if the most recent value of the instantaneous efficiency of the SCR catalyst is equal to or below the instantaneous efficiency threshold;
determine whether the overall operating efficiency of the SCR catalyst has dropped below an overall operating efficiency threshold; and
report when the overall operating efficiency of the SCR catalyst has dropped below the overall operating efficiency threshold;
wherein the second set of coefficients weighs the most recent instantaneous efficiency value more heavily than preceding instantaneous efficiency values as compared with the first set of coefficients.

11. The system of claim 10, wherein the controller determines the overall operating efficiency of the SCR catalyst by summing values of the instantaneous efficiency weighted by the second set of coefficients for a predetermined number of values.

12. The system of claim 11, wherein the controller determines the overall operating efficiency of the SCR catalyst by employing an exponentially-weighted moving average (EWMA) filter to decrease the effect of more recent instantaneous efficiency values on the overall operating efficiency determination.

13. The system of claim 10, wherein the controller is configured to report when the overall operating efficiency of the SCR catalyst has dropped below the overall operating efficiency threshold by generating an alert to an operator of the engine.

14. The system of claim 10, wherein the engine is a diesel type and the reductant is a diesel-exhaust-fluid (DEF).

15. The system of claim 10, wherein the predetermined number of values of the instantaneous efficiency is collected during a single key cycle of the engine.

16. The system of claim 10, wherein the overall operating efficiency of the SCR catalyst being below the overall operating efficiency threshold is indicative of the SCR catalyst having failed.

17. A vehicle comprising:
an internal combustion engine configured to propel the vehicle;
an exhaust passage configured to direct an exhaust gas stream from the engine to a selective-catalytic-reduction (SCR) catalyst;
a reservoir configured to supply a reductant through the passage and into the SCR catalyst for reducing oxides of nitrogen ($NO_X$) in the exhaust gas stream; and
a controller configured to:
monitor instantaneous efficiency of the SCR catalyst;
determine an overall operating efficiency of the SCR catalyst by summing values of the instantaneous efficiency weighted by a first set of coefficients if the most recent value of the instantaneous efficiency of the SCR catalyst is above an instantaneous efficiency threshold;
determine the overall operating efficiency of the SCR catalyst by summing values of the instantaneous efficiency weighted by a second set of coefficients if the most recent value of the instantaneous efficiency of the SCR catalyst is equal to or below the instantaneous efficiency threshold;
determine whether the overall operating efficiency of the SCR catalyst has dropped below an overall operating efficiency threshold; and
report when the overall operating efficiency of the SCR catalyst has dropped below the overall operating efficiency threshold;
wherein the second set of coefficients weighs the most recent instantaneous efficiency value more heavily than preceding instantaneous efficiency values as compared with the first set of coefficients; and wherein the overall operating efficiency of the SCR catalyst being below the overall operating efficiency threshold is indicative of the SCR catalyst having failed.

18. The vehicle of claim 17, wherein the controller determines the overall operating efficiency of the SCR catalyst by summing values of the instantaneous efficiency weighted by the second set of coefficients for a predetermined number of values during a single key cycle of the engine.

19. The vehicle of claim 18, wherein the controller determines the overall operating efficiency of the SCR catalyst by employing an exponentially-weighted moving average (EWMA) filter to decrease the effect of more recent instantaneous efficiency values on the overall operating efficiency determination.

20. The vehicle of claim 17, wherein the engine is a diesel type and the reductant is a diesel-exhaust-fluid (DEF).

* * * * *